United States Patent
Buch et al.

(10) Patent No.: US 10,114,614 B2
(45) Date of Patent: *Oct. 30, 2018

(54) RANDOM NUMBER GENERATION USING SWITCHING REGULATORS

(71) Applicant: Seagate Technology LLC, Cupertino, CA (US)

(72) Inventors: Bruce Douglas Buch, Westborough, MA (US); Jon David Trantham, Chanhassen, MN (US)

(73) Assignee: Seagate Technology LLC, Cupertino, CA (US)

( * ) Notice: Subject to any disclaimer, the term of this patent is extended or adjusted under 35 U.S.C. 154(b) by 803 days.

This patent is subject to a terminal disclaimer.

(21) Appl. No.: 14/328,504

(22) Filed: Jul. 10, 2014

(65) Prior Publication Data

US 2018/0196640 A1    Jul. 12, 2018

Related U.S. Application Data

(63) Continuation of application No. 13/297,009, filed on Nov. 15, 2011, now Pat. No. 8,788,551.

(51) Int. Cl.
   *G06F 7/58* (2006.01)
(52) U.S. Cl.
   CPC .................. *G06F 7/588* (2013.01)
(58) Field of Classification Search
   CPC ............. G06F 7/58; G06F 7/582; G06F 7/588
   See application file for complete search history.

(56) References Cited

U.S. PATENT DOCUMENTS

| | | | |
|---|---|---|---|
| 5,510,698 A | 4/1996 | Stankovic et al. |
| 5,961,577 A | 10/1999 | Sdenen et al. |
| 5,963,104 A | 10/1999 | Buer |
| 6,061,702 A | 5/2000 | Hoffman |
| 6,065,029 A | 5/2000 | Weiss |
| 6,369,727 B1 | 4/2002 | Vincze |
| 6,643,374 B1 | 11/2003 | Wells et al. |
| 6,831,910 B1 | 12/2004 | Moon et al. |
| 6,831,980 B1 | 12/2004 | Borza et al. |
| 7,752,247 B2 | 7/2010 | Wilber |

(Continued)

FOREIGN PATENT DOCUMENTS

| EP | 0365930 | 5/1990 |
|---|---|---|
| EP | 1361507 | 11/2003 |

(Continued)

OTHER PUBLICATIONS

S. Callegari. "Embeddable ADC-Based True Random Number Generator for Cryptographic Applications Exploiting Nonlinear Signal Processing and Chaos." IEEE Transact. on Signal Processing, vol. 53, No. 2, pp. 793-805 (Feb. 2005).

(Continued)

*Primary Examiner* — Chuong D Ngo
(74) *Attorney, Agent, or Firm* — Crawford Maunu PLLC

(57) ABSTRACT

Random numbers are generated using entropic properties associated with circuit hardware. Consistent with one method, a switching voltage regulator circuit is used to generate a random number. Data that is responsive to switching states of the switching voltage regulator circuit is generated. A multi-bit random number is then generated from the generated data.

20 Claims, 7 Drawing Sheets

(56) References Cited

U.S. PATENT DOCUMENTS

| | | | |
|---|---|---|---|
| 7,962,539 | B2 | 6/2011 | Barak et al. |
| 8,788,551 | B2* | 7/2014 | Buch .................. G06F 7/588 |
| | | | 708/250 |
| 2003/0037079 | A1 | 2/2003 | Wilber |
| 2004/0017235 | A1 | 1/2004 | Hars |
| 2005/0004959 | A1 | 1/2005 | Hars |
| 2005/0004960 | A1 | 1/2005 | Hars |
| 2006/0294312 | A1 | 12/2006 | Walmsley |
| 2007/0100921 | A1 | 5/2007 | Barnett et al. |
| 2007/0133790 | A1* | 6/2007 | Chang .................. G06F 7/588 |
| | | | 380/46 |
| 2008/0136395 | A1 | 6/2008 | Bennett |
| 2008/0313249 | A1 | 12/2008 | Fukushima et al. |
| 2009/0077147 | A1 | 3/2009 | Hars |
| 2009/0106339 | A1 | 4/2009 | Vasyltsov et al. |
| 2009/0172056 | A1 | 7/2009 | Pradhan et al. |
| 2010/0106757 | A1 | 4/2010 | Matthews, Jr. et al. |
| 2011/0096930 | A1 | 4/2011 | Walmsley |
| 2011/0123022 | A1 | 5/2011 | Oishi et al. |
| 2011/0128081 | A1 | 6/2011 | Hars |
| 2011/0131263 | A1 | 6/2011 | Vasyltsov et al. |
| 2011/0131264 | A1 | 6/2011 | Hars |

FOREIGN PATENT DOCUMENTS

| | | |
|---|---|---|
| WO | 00/59513 | 10/2000 |
| WO | 01/79989 | 10/2001 |
| WO | 2004012334 | 2/2004 |

OTHER PUBLICATIONS

W. Che et al. "Scheme of Truly Random Number Generator Application in RFID Tag." Auto-ID Labs White Paper, Fudan WP-Hardware-023, p. 1-11 (2006).

S. Kim et al. "Combined Dithered Sigma-Delta Modulation based Random PWM Switching Scheme." Journal of Power Electronics (JPE), vol. 5, No. 9, pp. 667-679 (Sep. 2009).

Wayne R. Coppock and Colin R. Philbrook. "A Mathematical and Physical Analysis of Circuit Jitter with Application to Cryptographic Random Bit Generation." Worcester Polytechnic Institute. B.S. Degree Project Report, pp. 1-36 (submitted Apr. 28, 2005).

Markus Rohe. "RANDy—A True-Random Generator Based on Radioactive Decay." Saarland University, pp. 1-36 (2003).

G. Zhang et al. "Zigguarat-based Hardware Gaussian Random Number Generation." Field Programmable Logic and Applications, 2005. International Conference, 6 pgs (2005).

J. Holleman et al. "A 3 W CMOS True Random Number Generator With Adaptive Floating-Gate Offset Cancellation." IEEE Journal of Solid State Circuits, vol. 43, No. 5, pp. 1324-1336 (May 2008).

C. Petrie et al. "Modeling and simulation of oscillator-based random number generators." Circuit and Systems, 1996 IEEE International Symposium, vol. 4, pp. 324-327 (May 1996). Abstract Only.

M. Dichtl et al. "High Speed True Random Number Generation with Logic Gates Only." Cryptographic Hardware and Embedded Systems—CHES 2007, vol. 4727, p. 45-62 (2007).

I. Vasyltsov et al. "Fast Digital TRNG Based on Metastable Ring Oscillator." CHES 2008, 10th Int'l Workshop, p. 164-180 (Aug. 2008).

M. Epstein et al. "Design and Implementation of a True Random Number Generator Based on Digital Circuit Artifacts." CHES 2003, vol. 2779, 14 pgs (Sep. 2003).

V. Fischer et al. "Simple PLL-Based True Random Number Generator for Embedded Digital Systems." DDECS 7th IEEE Workshop, pp. 129-136 (Apr. 2004).

V. Fischer et al. "True Random Number Generators in Configurable Logic Devices." Project ANR—ICTeR, Vers. 1.02, pp. 1-58 (Feb. 2009).

L. Hars. "Random Number Generation Based on Oscillatory Metastability in Ring Circuits." Cryptology ePrint Archive: Report 2011/637, pp. 1-15 (2011).

L. Hars. "Random Topics (selling sand in the desert)." Summercon 2004—PowerPoint, www.hars.us/papers/randomtopics-summercon.ppt. 65 pgs.

* cited by examiner

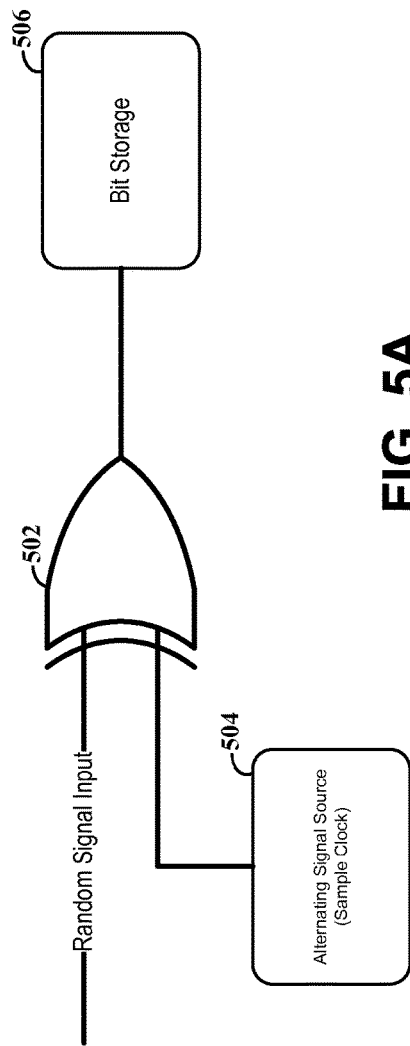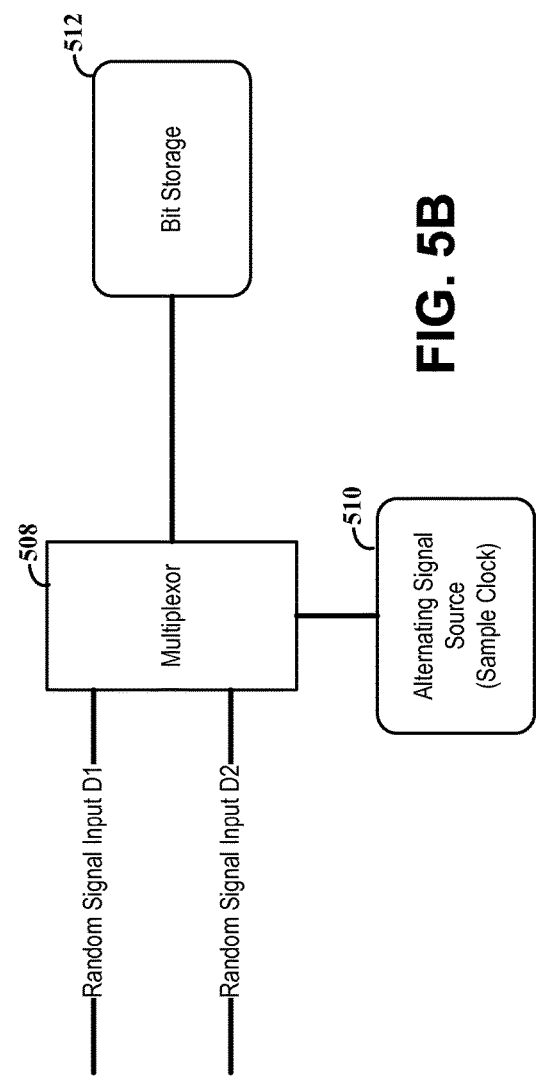
FIG. 5A
FIG. 5B

RANDOM NUMBER GENERATION USING SWITCHING REGULATORS

FIELD OF THE INVENTION

Aspects of the present disclosure relate to generating random numbers from entropic properties of switching regulators.

BACKGROUND

Computer systems generally contain some type of mass-storage memory that is able to retain data when the computer system is powered down. This type of memory is referred to as nonvolatile memory because it is able to maintain data integrity when the computer system is not powered. A common type of nonvolatile mass-storage memory is a hard disc drive (HDD) that uses a rotating magnetic media. HDDs are used for home-computers, servers, and various other devices. HDDs with rotating magnetic media have been in use for many years and have undergone various improvements, including efficiency, reliability and storage capacity. Various applications, however, are beginning to use other types of nonvolatile memory with more frequency. Solid State Devices/Drives (SSDs) using electronic memory storage components are one such alternative nonvolatile memory. SSDs are attractive for many applications because, unlike HDDs, they have no need for moving parts. Although the lack of moving parts is generally beneficial, mechanical components in a hard drive can provide sources of entropy for random number generators that are not available in a SSD.

For a variety of reasons it is desirable to encrypt data stored in a nonvolatile mass-storage memory device. Some drives, such as Seagate Secure™ Self-Encrypting Drives, automatically encrypt data as it is stored using internal encryption hardware. A random number generator is commonly part of encryption hardware. Moving from HDDs to SSDs, however, raises a number of unsolved, and often unrecognized, issues. Aspects of the present invention, although not limited thereto, can be appreciated in the context of such mass-memory storage devices.

SUMMARY

The present disclosure is directed to systems and methods for use with the generation of random numbers using a switching regulator as a source of randomness. These and other aspects of the present disclosure are exemplified in a number of illustrated implementations and applications, some of which are shown in the figures and characterized in the claims section that follows.

Consistent with embodiments of the present disclosure, a switching voltage regulator circuit is used to generate a random number. Data that is responsive to time periods between on/off states for a switch of the switching voltage regulator circuit is generated. A multi-bit random number is then generated from the generated data.

Embodiments of the present disclosure are directed toward a circuit that includes a voltage regulator configured to provide a regulated voltage at an output. The voltage regulator includes a feedback path that is configured and arranged to provide feedback responsive to the output. Circuit logic is configured and arranged to provide a switch control signal that varies according to the provided feedback. A switch is configured and arranged to provide power to the output in response to the control signal. A random number generator is configured and arranged to receive the control signal as an input and to provide a random number in response to entropic properties of the control signal.

The above summary is not intended to describe each illustrated embodiment or every implementation of the present disclosure. The figures and detailed description that follow, including that described in the appended claims, more particularly exemplify these embodiments.

BRIEF DESCRIPTION OF THE DRAWINGS

The disclosure may be more completely understood in consideration of the detailed description of various embodiments and in connection with the accompanying drawings as follows:

FIG. 5A depicts a diagram of a system for providing a whitening function using an alternating signal source, consistent with embodiments of the present disclosure;

FIG. 5B depicts a diagram of a system for providing a whitening function using multiple entropic control signals from a synchronous switching regulator, consistent with embodiments of the present disclosure.

Figure 1A:
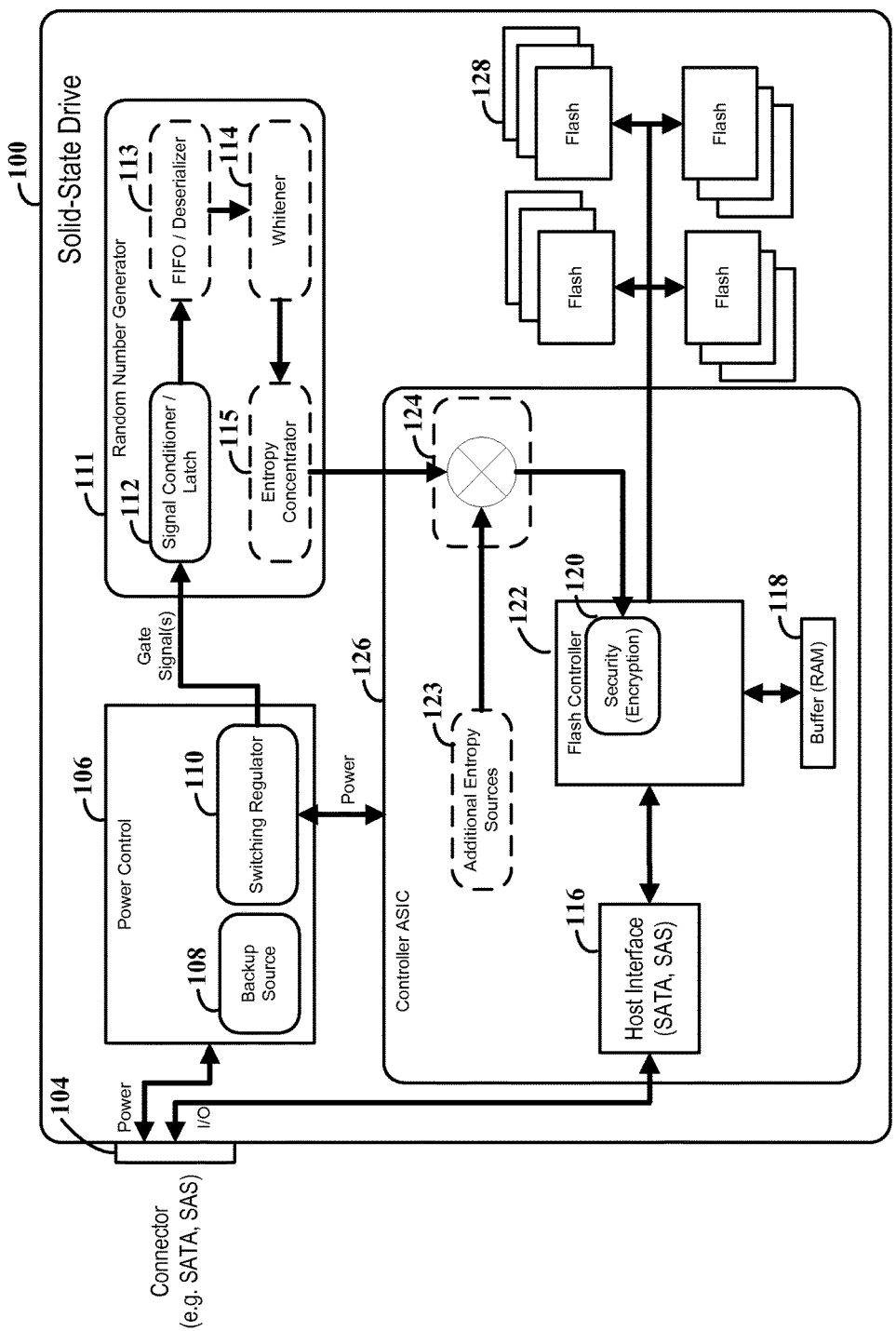
FIG. 1A depicts a solid-state drive (SSD) with a random number generation circuit, consistent with embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure are believed to be useful for generating random numbers. A particular application of the present disclosure relates to random number generation using a switching regulator as a source of randomness, which can be particularly useful in solid state devices (SSDs) that provide nonvolatile memory storage alternatives to traditional rotating magnetic media. While the present disclosure is not necessarily limited to such applications, various aspects of the invention may be appreciated through a discussion of various examples using this context.

An embodiment of the present disclosure relates to methods and circuits that generate random numbers, which can be used as part of an encryption algorithm. For instance, some encryption algorithms rely upon data being unpredictable. To achieve this unpredictability, some encryption algorithms use random numbers that may be required to be generated frequently. The strength of such encryption algorithms is often only as good as the random number generation process. A poor random number generation process can result in an attacker being able to defeat the encryption algorithm.

The generation of high-entropy, random numbers is useful for a variety of applications. One such application relates to security devices that encrypt and decrypt information. For instance, the United States government's Cryptography Module Validation Program validates cryptographic modules against the Federal Information Processing Standards Publication (FIPS PUB) 140-2, which is fully incorporated herein by reference. As part of this validation, portions of random number generators are assessed for their entropy and resistance to hacking. Accordingly, embodiments of the present disclosure relate to providing entropy sufficient to meet this and other standards. Moreover, aspects of the present disclosure recognize that cost savings can be significant when using entropic properties of switching regulators, e.g., because the switching regulators are already present and do not add cost to many circuit designs.

Random number generators can be used in many different applications including, but not limited to, self-encrypting disc drives, such as the Seagate Momentus Full Disk Encryption (FDE) drives. Random numbers can be used to generate encryption keys used to provide encrypted secure communication. A particular type of encryption uses nonces (numbers only used once). Hard disc drives have a number of physical entropy sources that can be used to initialize or seed cryptographic random number generators. Many of these physical entropy sources are derived from the mechanical movement of the disk drive components. The entropy of such physical sources provides a level of confidence that the generated random numbers are truly random.

Solid state drives (SSDs) do not include many of the physical sources of entropy because they have little or no moving parts. Accordingly, aspects of the present disclosure are directed toward random number generation using entropy from switching regulators, whether in an SSD or otherwise.

Switching regulators come in many different forms including, but not necessarily limited to, buck converters, boost converters, buck-boost converters, inverting regulators, and other types of DC-DC converters. Aspects of the present disclosure are directed toward the use of entropic properties from one or more control signals of a switching regulator. Although switching regulators can be affected by an outside user, for example, by changing the supplied voltage or by carefully controlling the commands sent to the storage device, there remains a small amount of intrinsic random jitter in the voltage regulator system that cannot be reduced. In addition to this noise floor, the interactions of the many various elements within the components of a SSD can produce additional noise upon the voltage regulator that is nearly impossible to control. Experimental results of one embodiment suggest that even when the drive was placed into a very quiescent state there remained enough intrinsic random jitter to generate 1 Mbps of entropy utilizing a 6 GHz sampling clock.

Embodiments of the present disclosure are directed toward a switching regulator circuit that has entropy in its switching/control signals and toward a random number generator that extracts the entropy from the control signals in order to generate random numbers. The switching regulator circuit includes one or more switches controlled by the switching signals. The control signals have entropic properties that are extracted by the random number generator in order to produce random numbers. The sources of the entropic properties can be many including, but are not necessarily limited to, varying of a load connected to a regulator output, electrical noise (internal or external), variations in temperature, component tolerances and signal delay. These and other factors create both small signal variations, such as jitter, and larger signal variations, such as changes to a frequency or duration of the control signals.

Turning now to the figures, FIG. 1A depicts a solid-state drive (SSD) with a random number generation circuit, consistent with embodiments of the present disclosure. SSD 100 can take a number of different physical forms. In some embodiments, SDD 100 can be designed to conform to one or more traditional form factors for disc drives. In other embodiments, SSD 100 can be designed according to customized form factors. In still other embodiments, SSD 100 can be located on a mother board or as a component of a system-on-chip (SOC).

SSD 100 can also be designed to conform to various different electrical and communications protocols including, but not necessarily limited to, Serial Advanced Technology Attachment (SATA), Peripheral Component Interconnect Express (PCIe), Serial Attached Small Computer System Interface (SAS), and Universal Serial Bus (USB) which are explicitly referenced in connection with both host interface 116 and connector 104. Embodiments of the present disclosure, however, can also use older or newer interface protocols and both host interface 116 and connector 104 can be designed accordingly.

Consistent with certain embodiments of the present disclosure, one or more buffers 118 can be used to store data communicated to and from SSD 100. This can be particularly useful for improving access times caused by relatively slow read or write time for the nonvolatile (e.g., flash) memory 128. The buffer 118 could also be used to store firmware metadata, such as the logical to physical mapping of storage blocks. The flash controller 122 can be configured to queue or otherwise control accesses to nonvolatile memory 128 in order to take advantage of the speed of buffer 118. Although a buffer internal to the controller application-specific integrated circuit (ASIC) 126 is depicted in FIG. 1A, the buffer could also be an external component, such as a separate DRAM chip.

Different communications protocols can define different power providing capabilities and/or the properties of a power source can vary from system to system. Moreover, the various components of SSD 100 can have different power requirements. Accordingly, SSD 100 includes a power control circuit/module 106. In FIG. 1A this power control circuit 106 includes a switching regulator 110. This switching regulator can perform a direct-current to direct-current (DC/DC) conversion to provide suitable voltage(s) for the components of SSD 100. Although only a single switching regulator 110 is depicted, there can be several such regulators in a single SSD 100.

In certain embodiments, the power control circuit 106 can also include a backup power source 108. When host-supplied input power is lost at the SSD 100, it can be important to briefly maintain power in order to allow data to be written from buffer 118 to a non-volatile location. Backup power source 108 can provide this power. Backup power source 108 can be implemented as, for example, a battery or as a capacitor.

The switching regulator 110 operates by turning on and off at least one switch, such as a metal-oxide-semiconductor field-effect transistor (MOSFET). The at least one switch is configured in a manner that this turning on and off generates a regulated voltage. For instance, a control signal can be used to turn the switch on and off. This control signal can oscillate according to a period Ts. The duty cycle of the on-off switching is equal to the fraction of time that the switch is on relative to the total on and off time for the switch. The switching frequency fs is equal to 1/Ts. In certain embodiments of the present disclosure, the switch can be realized using semiconductor devices such as power MOSFETs, insulated gate bipolar transistors (IGBTs), bipolar (junction) transistors (BJTs), or thyristors. The switching frequencies can vary significantly and can include, but are not limited to, frequencies of between 100 kHz to 10 MHz, depending upon the particular application.

Aspects of the present disclosure are directed toward applications that use random numbers. For instance, a number of different security features can use random numbers to prevent malicious/unwanted access to data. In a particular implementation, SSD 100 can be configured to function as a self-encrypting disc drive that uses a security/cryptographic module 120 to encrypt and decrypt data stored on the nonvolatile memory 128. In order to facilitate secure communications, the cryptographic functions of security module 120 can provide improved security when there is a source of truly random numbers, such as those generated by a random number generator 111. The generated random numbers can be used for encryption keys, facilitating secure communication (e.g., via nonces) by performing self-tests and other functions. The present disclosure recognizes that storing prior states of a random number generator poses security risks because an attacker could potentially read the stored states and use this information to predict or force the generation of the same random sequence as was previously stored. This can result in repeated nonces and/or the reuse of the same encryption key(s), which can comprise security of the device.

Certain embodiments of the present disclosure are directed toward the use of a pseudorandom number generator 114, which can generate a sequence of numbers using an algorithm that is sufficiently complex to make it impractical for an attacker to predict the next generated number even given knowledge of previously-generated numbers. A pseudorandom number generator can be used in conjunction with a random number generator. For example, in FIG. 1A, the pseudorandom number generator (referred to in the drawing as a "whitener" 114) is a component of the random number generator. Its purpose is to mitigate any fixed pattern effects in the captured bit sequence.

In an alternative embodiment, the pseudorandom number generator is external to the random number generator. In such an embodiment, the pseudorandom generator can issue a special request for a seed, such as at boot time, from a random number generator 111. Such pseudorandom number generators, however, are still deterministic and can be subject to security problems if the initial seed number is comprised or predictable. Accordingly, entropic properties of switching regulator 110 are used by random number generator 111. This entropic source can help ensure the uniqueness of the generated pseudorandom sequences from a resultant seed.

The random number generator 111 also contains an optional component labeled an entropy concentrator 115. In embodiments with less entropy, multiple random numbers can be generated and combined to increase the entropy of the output; for example, by XORing many samples together.

The output of the random number generator 111 can also optionally be combined with the output of other random number generators. For example, FIG. 1A shows additional entropy sources 123 (e.g., a ring oscillator circuit). The output of one or more additional entropy sources can be convolved 124 with the output of random number generator 111, for example by XORing the streams together, to produce a different random number.

Particular embodiments of the present disclosure are directed toward random number generator 111 producing random numbers based upon entropic properties of the switching regulator 110. These entropic properties can be quantified as a measure of unpredictability in a signal value as it changes over time. For instance, the control signal of switching regulator 110 can exhibit a high level of entropy. The entropic properties of the control signal can originate from sources including, but not necessarily limited to, varying of a load connected to a regulator output, electrical noise (internal or external), variations in temperature, component tolerances and signal delay. As discussed above, these and other factors create both small signal variations, such as jitter, and larger signal variations, such as changes to a frequency or duration of the control signals. Random number generator 111 can be configured to quantify the entropic properties in a number of different manners, some of which are discussed in more detail herein. These different quantification mechanisms can be used independently or in combination.

Consistent with embodiments of the present disclosure, random number generator 111 quantifies the entropic properties by periodically sampling the control signal (at 112) in order to use the sampled control signal to generate one or more data bits. For instance, the switching state of the control signal can be periodically latched in a register to generate individual bits. The generated individual data bits can be stored until a sufficient number of bits have been generated and stored, such as by FIFO/Deserializer 113. The sampling rate can be set so that the sampling occurs at a rate that is nominally much greater than the period of hysteretic switching for the switching regulator 110, preferably faster than the period of quiescent random jitter of the switching regulator.

According to other embodiments of the present disclosure, random number generator 111 quantifies the entropic properties by storing or latching the value of a counter in response to signal (state) transitions of the control signal. The counter can be configured to operate a counting rate that is both significantly higher (e.g., hundreds of times or more) than that of the switching regulator 110. Moreover, the counter counting rate is asynchronous to that of the switching regulator 110.

Still other embodiments of the present disclosure relate to the use of multiple switching regulators 110. In certain circuits, SSD or otherwise, there are multiple switching regulators. For instance, multiple switching regulators can be used to provide different voltage levels for different electronic components or to provide localized power sources. The multiple different switching regulators can be used in parallel or in direct combination. For instance, two parallel streams of random bits can be generated from each switching regulator. The two sets of resulting bits can be merged to generate a single random number or to generate separate and distinct random numbers (e.g., by alternating bits from each of the switching regulators or using XOR functions).

Aspects of the present disclosure recognize that the duty cycle of a control signal can vary according to the ratio between the input supply voltage (Vin) and the output supply voltage (Vout) of the switching regulator 110. For instances where the Vin is significantly different from Vout, the duty cycle can be considerably different from 50%. Thus, if individual bits are latched based upon the state of the control signal, the result can be a string of bits for which the probability of one state (e.g., either '0' or '1') is higher than the probability of another state (e.g., the other of '0' or '1'). This bit biasing, with either 1 s or 0 s predominating, can be compensated for by using various whitening techniques, some of which are discussed in more detail herein. Consistent with embodiments of the present disclosure, the polarity of the bits can be alternatively inverted, resulting in an even probability of any randomly selected bit being either a '1' or a '0'. Other aspects of the present disclosure recognize that such alternating of bits can result in a pattern of bits for which the probability of two consecutive bits being the same is lower than a truly random distribution of bits. Further (or different) data processing steps can also be implemented to account for this distribution (e.g., using a jumbled/randomized ordering of the collected bits).

Embodiments of the present disclosure also relate to the use of further processing of the quantified value of the entropic properties, e.g., to remove or mask any bias.

Figure 1B:
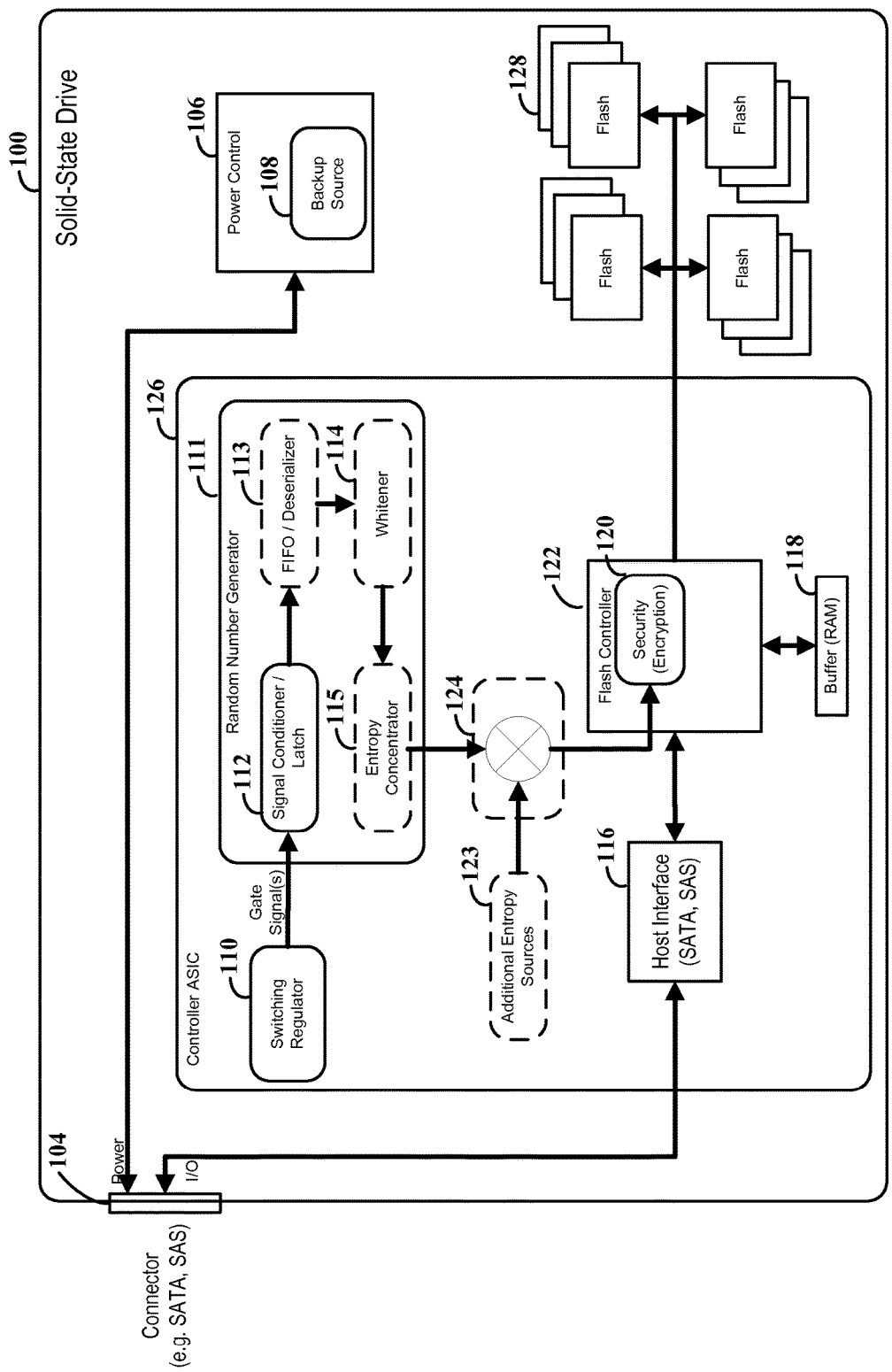
FIG. 1B depicts a solid-state drive (SSD) with a random number generation circuit on a single die or package, consistent with embodiments of the present disclosure.

FIG. 1B depicts a preferred alternative arrangement of the components shown in FIG. 1A. While the components, such as the switching regulator 110 in FIG. 1A may be separate distinct components, additional robustness against hacking and observability can be achieved by integrating the switching regulator 110, and the random number generator 111 within a single die or package of a single chip. In some instances this can be accomplished using a single controller ASIC 126.

Figure 2:
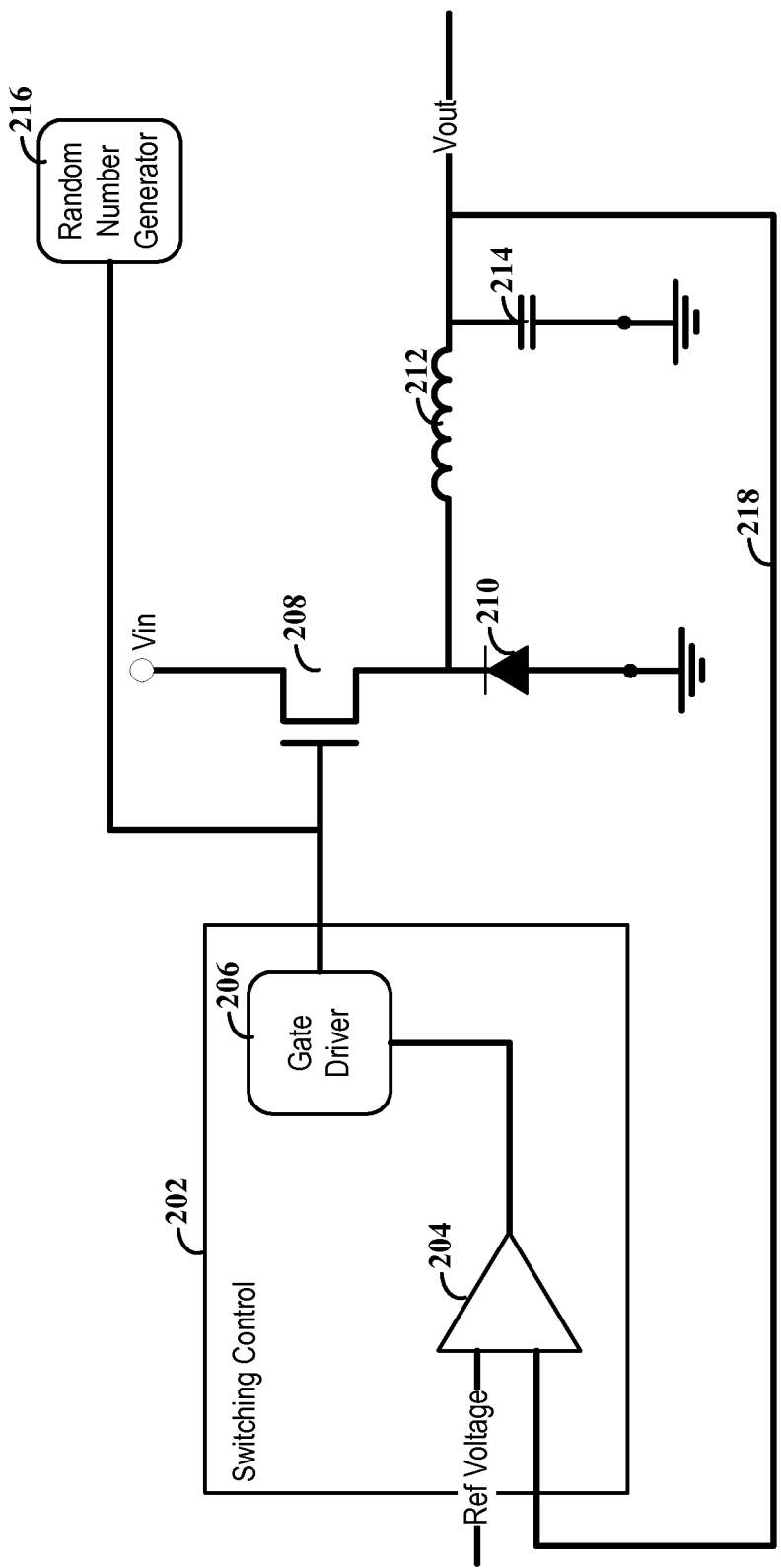
FIG. 2 depicts a random number generator using a control signal from a buck converter, consistent with embodiments of the present disclosure.

FIG. 2 depicts a random number generator using a control signal from a buck converter, consistent with embodiments of the present disclosure. Switching control 202 generates a control signal that turns switch 208 on or off. When switch 208 is on, the inductor 212 sources current from input voltage source Vin. Both inductor 212 and capacitor 214 store energy in this state. When switch 208 is off, the charged inductor 212 continues to source current to the output, with diode 210 providing a current path. This switching action generates the output Vout.

The output Vout is connected back to switching control 202 via a feedback path 218. A voltage divider (not shown) can be used to reduce the feedback voltage to match the reference voltage if Vout is greater than the reference voltage. Switching control 202 thereby regulates the output voltage Vout through the generation of a control signal for switch 208. The manner in which switching control 202 generates the control signal can vary according to the particular configuration and design. For instance, a comparator 204 can compare Vout to a reference voltage to generate the control signal. The comparator can be designed with a hysteresis that can improve the efficiency of the converter. Other possible configurations include, without limitation, periodic sampling of Vout using an analog-to-digital converter (ADC), using pulse width modulation (PWM), using pulse frequency modulation (PFM) and/or using combinations thereof. These combinations might include the use of PWM during normal/high load conditions and PFM during lower load conditions. The generated control signal can then be used by random number generator 216, which quantifies entropic properties of the control signal.

Figure 3:
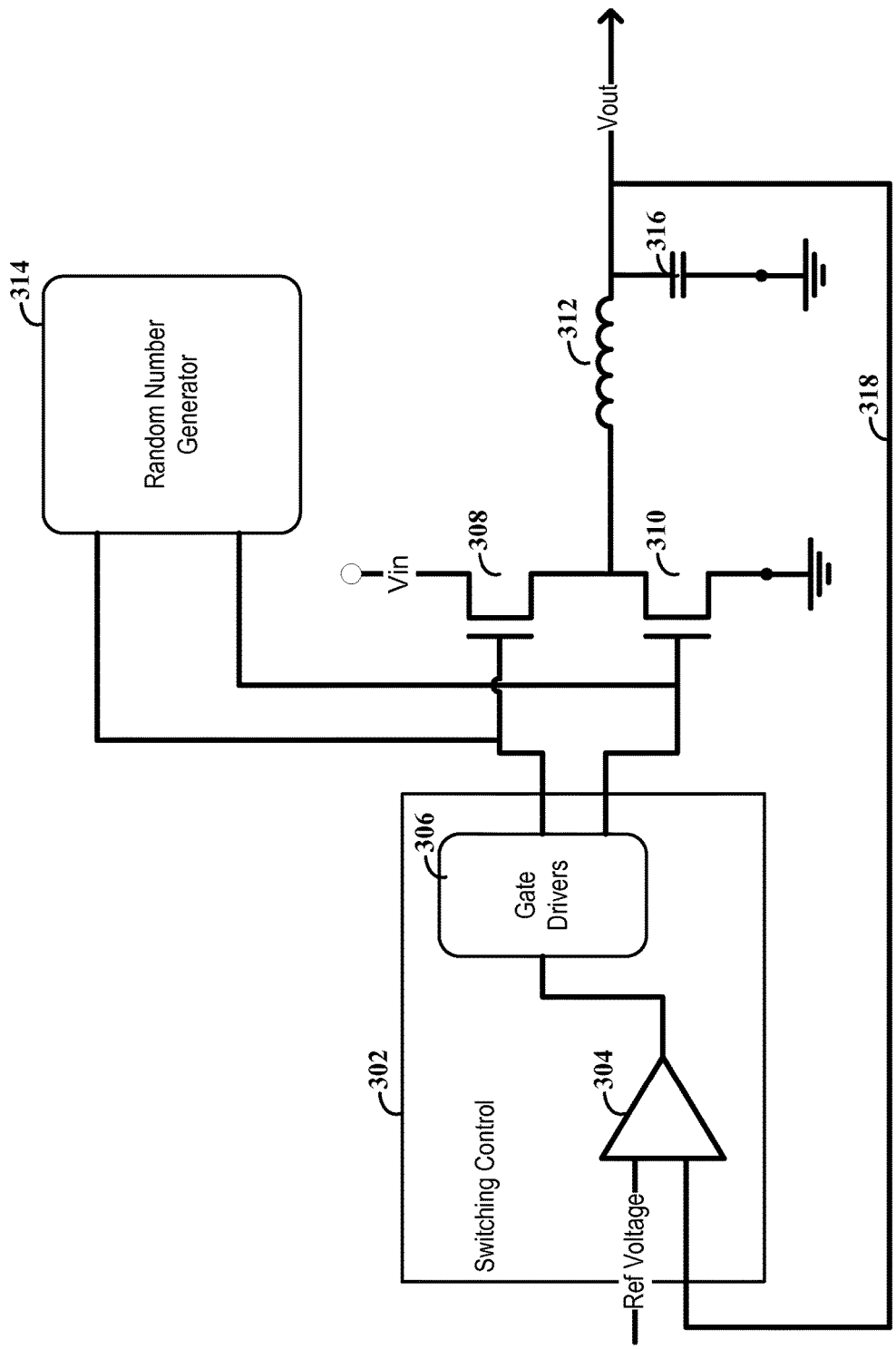
FIG. 3 depicts a random number generator using a control signal from a synchronous buck converter, consistent with embodiments of the present disclosure.

FIG. 3 depicts a random number generator using a control signal from a synchronous buck converter, consistent with embodiments of the present disclosure. The operation of the switching control 302, comparator 304, gate drivers 306, inductor 312, capacitor 316, and feedback 318 is generally consistent with the discussion of FIG. 2. To improve efficiency, the function of diode 210 is effectively replaced by a switch 310 such that switching control 302 enables switch 310 for a portion of time when switch 308 is off (and vice versa).

Random number generator 314 can use control signals from switch 308, switch 310, or from both of these switches. For instance, data bits can be derived from entropic properties of each of the control signals in an alternating manner to reduce the previously-mentioned effect of a duty cycle that is not 50%. In another instance, quantified values of the entropic properties of each of the control signals can be combined (e.g., XORed) to generate data bits.

Aspects of the present disclosure recognize that many of sources of the entropic properties of such a control signal are present irrespective of the specific type/configuration of the switching control 202/302.

Figure 4:
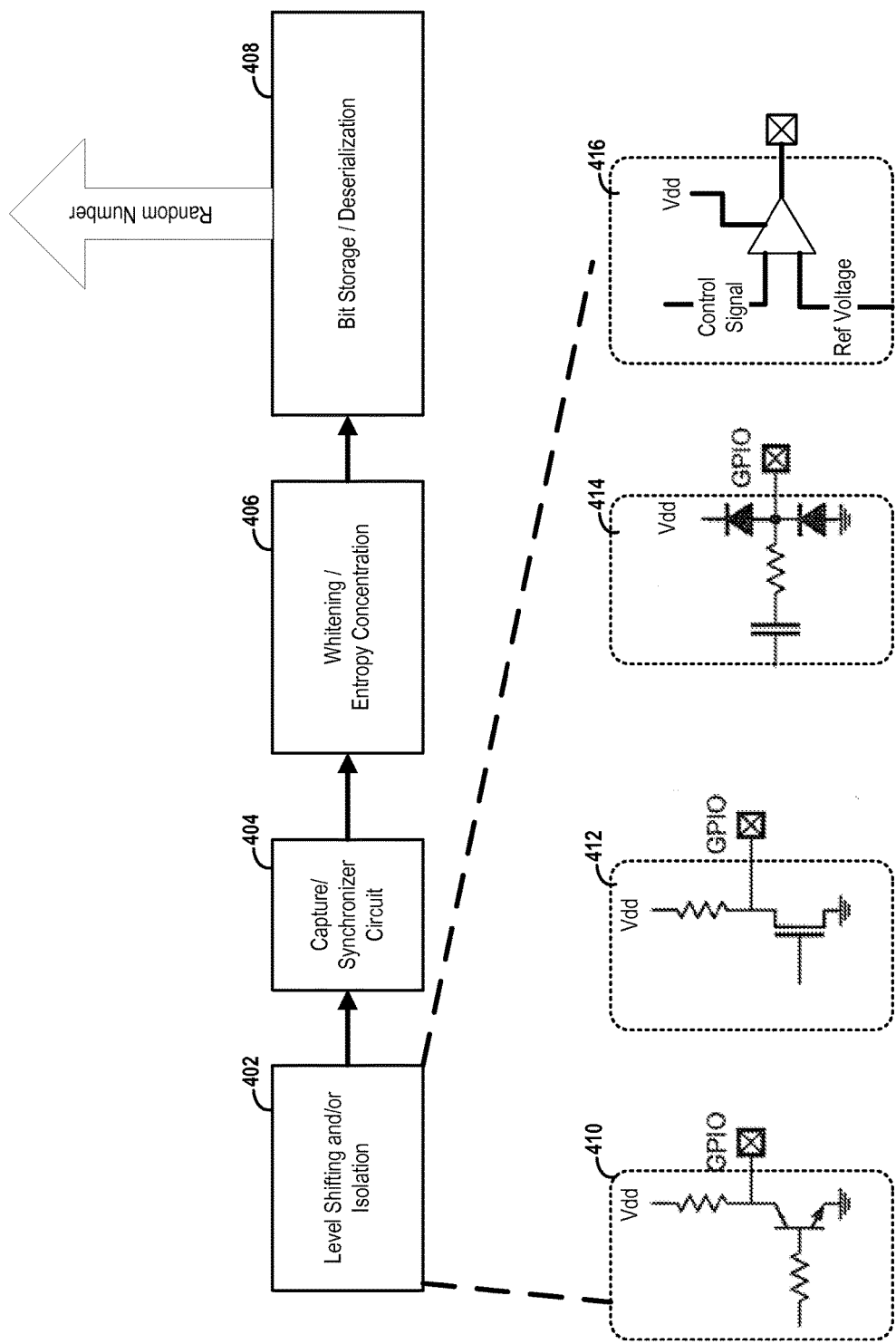
FIG. 4 depicts a block diagram for receiving, conditioning and otherwise quantifying entropic properties from a control signal of a switching regulator, consistent with embodiments of the present disclosure.

FIG. 4 depicts a block diagram for receiving, conditioning and otherwise quantifying entropic properties from a control signal of a switching regulator, consistent with embodiments of the present disclosure. Level shifting and/or isolation circuit 402 can receive one or more control signals from one or more switching regulators. Depending upon the circuit design, the circuit 402 can provide isolation, buffering and/or level shifting of the control signal(s). Circuits 410-416 provide a few non-limiting examples. Circuit 410 uses a BJT and a resistor pull-up to Vdd. The output of circuit 410 will therefore have a voltage shifted between ground and Vdd. Circuit 412 operates similar to that of circuit 410 but uses a field-effect transistor (FET) in place of the BJT. Circuits 410 and 412 can therefore create an output signal with a voltage higher (e.g., Vdd) than that of the control signal.

Circuit 414 uses AC/capacitive coupling to generate the output signal. Diodes are used to clamp the signal between Vdd and ground. Circuit 416 uses a comparator to generate an output signal relative to a reference voltage. The reference voltage can be adjusted to a desired level that is consistent with the voltage swing of the control signal.

Capture/synchronizer circuit 404 operates to generate digital bits from the output circuit 402. These digital bits can be capture/generated using a variety of different circuits, including circuits discussed elsewhere in this disclosure. For instance, the output of circuit 402 can be latched into a register using a clock signal, which is set to a frequency that allows entropic properties of the control signal to be captured. This can include setting the frequency such that the capture is asynchronous relative to a switching speed of the switching regulator. In another instance, the output of a counter can be latched/captured upon the transition of the control signal.

Whitening block 406 can optionally be implemented to help counteract biasing of the captured data bits. As mentioned earlier, a pseudo-random number generator can be used for whitening. A whitening algorithm can be employed in which two bits are considered at time and the action is taken according to Table 1. This algorithm can also be repeated on the resulting outputs, although this can adversely affect the bit generation rate of the resulting random numbers. Table 1 can also be modified to invert the output '1' or '0' values. The resulting random number bits are then stored in a memory 408 for subsequent access. Another, non-limiting, solution includes the use of hash functions. Various other whitening functions can be applied as desired and also used in different combinations. For instance, a hash function can be applied to the output of whitening algorithm of Table 1.

TABLE 1

| Input | Action |
|---|---|
| 0, 0 | Discard bits |
| 1, 1 | Discard bits |
| 0, 1 | Output a '1' |
| 1, 0 | Output a '0' |

FIG. 5A depicts a diagram of a system for providing a whitening function using an alternating signal source, consistent with embodiments of the present disclosure. The function of FIG. 5A periodically inverts the value of received random bits. This inversion helps to compensate for biasing of the generated random data bits (i.e., a bias where there is a higher probability of either a "0" or "1" bit occurring). In particular, XOR logic gate 502 receives the stream of (potentially biased) random bits as one input. Another input to XOR logic gate 502 is an alternating signal source 504, such as a clock. When the alternating signal source is a "0" value, the output of the XOR logic gate 502 is the same as the random bit. When the alternating signal source is a "1" value, the output of the XOR logic gate 502 is an inverted version of the random bit. Bits storage block 506 captures the bits produced by XOR logic gate 502. The alternating signal source 504 can be generated synchronously or asynchronously to the capture of bits by bits storage block 506.

The described controls signal inverting functionality can be accomplished using any number of different circuit configurations and is not necessarily limited to the specific circuit design depicted in FIG. 5A.

FIG. 5B depicts a diagram of a system for providing a whitening function using multiple entropic control signals from a synchronous switching regulator, consistent with embodiments of the present disclosure. A synchronous switching regulator produces two control signals that are, generally speaking, of opposite polarity. Accordingly, the multiplexor 508 is configured to select between each of these control signals based upon the value of the alternating signal source 510. In this manner, the output value of the multiplexor 508 has compensation for biasing present in a single control signal. Bits storage block 512 captures the bits produced by multiplexor 508. The alternating signal source 510 can be generated synchronously or asynchronously to the capture of bits by bits storage block 512.

The described alternating control signal functionality can be accomplished using any number of different circuit configurations and is not necessarily limited to the specific circuit design depicted in FIG. 5B.

Figure 6:
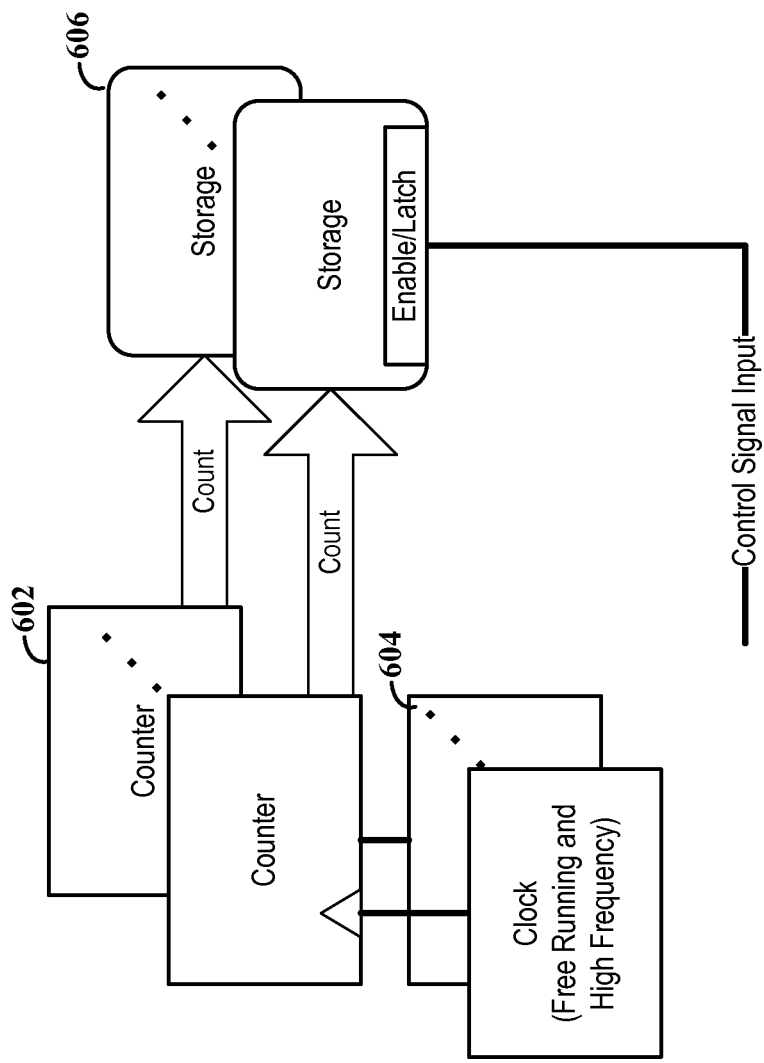
FIG. 6 depicts a block diagram of a system for capturing and/or quantifying entropic properties of a control signal, consistent with embodiments of the present disclosure.

FIG. 6 depicts a block diagram of a system for capturing and/or quantifying entropic properties of a control signal, consistent with embodiments of the present disclosure. Counter(s) 602 provide output bits that change over time. In a particular embodiment, the counter(s) 602 produce incrementally increasing data bits producing an output that "counts" every cycle. The cycle can be controlled by clock(s) 604. In certain embodiments the clock(s) 604 can operate as a free running clock with a high speed (relative to the cycle/speed of one or more switching regulator(s) and their control signal(s)). Storage component(s) 606 store/capture the output of counter(s) 602 in response to control signal(s) from switching regulator(s). This can be accomplished using various different circuits including, but not limited to, a set of registers that are clocked by the control signal(s).

A number of variations can be implemented from the functionality described in connection with FIG. 6. For instance, the counter(s) 602 could be configured and arranged to produce output data bits that are not sequential (e.g., a linear feedback shift register). Thus, the term "counter" is used as an example rather than in a limiting manner.

The signals and associated logic and functionality described in connection with the figures can be implemented in a number of different manners. Unless otherwise indicated, various general purpose systems and/or logic circuitry may be used with programs in accordance with the teachings herein, or it may prove convenient to construct a more specialized apparatus to perform the required method. For example, according to the present disclosure, one or more of the methods can be implemented in hard-wired circuitry by programming a general-purpose processor, other fully or semi-programmable logic circuitry, and/or by a combination of such hardware and a general-purpose processor configured with software.

It is recognized that aspects of the disclosure can be practiced with computer/processor-based system configurations other than those expressly described herein. The required structure for a variety of these systems and circuits would be apparent from the intended application and the above description.

The various terms and techniques are used by those knowledgeable in the art to describe communications, protocols, applications, implementations, mechanisms, etc. One such technique is the description of an implementation of a technique expressed in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, it is recognized that a block denoting "C=A+B" as an additive function whose implementation in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions can be stored for execution in a manner consistent with one or more of the methods of the present disclosure. The instructions can be used to cause a general-purpose or special-purpose processor that is programmed with the instructions to perform the steps of the methods. Alternatively, the steps might be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, such changes may include variations on mechanisms for capturing/quantifying entropic properties of a switching regulator. Such modifications and changes do not depart from the true spirit and scope of the present invention, which is set forth in the following claims.

What is claimed is:

1. A solid-state drive apparatus comprising:
electronic storage devices;
a voltage regulator configured and arranged to provide a regulated voltage at an output port, the voltage regulator including:
a feedback path configured and arranged to provide feedback responsive to the output port;
a logic circuit configured and arranged to provide a control signal that varies according to the provided feedback; and
a switch configured and arranged to receive the control signal, and to provide power to the output port in response to the control signal; and
a number generator configured and arranged to receive the control signal as an input and to provide a random number in response to entropic properties of the control signal.

2. The apparatus of claim 1, further including an external data-storage circuit configured and arranged to control access to the electronic storage devices.

3. The apparatus of claim 1, wherein the electronic storage devices are nonvolatile memory devices.

4. The apparatus of claim 1, wherein the voltage regulator includes one of a buck converter, a boost converter, a buck-boost converter, and an inverting regulator.

5. The apparatus of claim 1, further including an interface circuit configured and arranged to communicate data with external devices, and configured and arranged with the electronic storage devices to store received data in the electronic storage devices, and to transmit data from the electronic storage devices.

6. The apparatus of claim 1, wherein the number generator is configured and arranged to provide the random number by generating a multi-bit random number in response to a switching state of the switch.

7. The apparatus of claim 1, wherein the number generator is configured and arranged to generate the random number based on a random number.

8. The apparatus of claim 1, wherein the number generator is configured and arranged to provide the random number in response to entropic properties including at least one of: time periods between on and off states of the switch, variations of a load connected to the output port, electrical noise, variations in temperature, component tolerances, signal delay, and signal variations.

9. The apparatus of claim 1, wherein the number generator is configured and arranged to quantify the entropic properties by periodically sampling the control signal and using the sampled control signal to generate data.

10. The apparatus of claim 1, further including a register configured and arranged with the switch to store bits representing a state of the switch, the register being clocked using a clock that is asynchronous to switching cycles for the voltage regulator.

11. The apparatus of claim 1, wherein the number generator is configured and arranged to provide the random number by at least one of: inverting alternating bits of generated data, convolving data from multiple generating steps, and generating a first random number and using the first random number to generate the random number.

12. The apparatus of claim 1, wherein the number generator is configured and arranged to provide a different number by convolving the random number with an output of at least one other random number generated from a source of entropy other than a state of the switch.

13. The apparatus of claim 1,
further including a control element configured and arranged to vary a switching speed of the control signal using at least one of pulse width modulation and pulse frequency modulation, and
wherein the number generator is configured and arranged to use entropic properties of a switching speed of the control signal to generate the random number.

14. The apparatus of claim 1, wherein
the logic circuit is configured and arranged to provide one or more additional control signals that vary according to the provided feedback, and
the number generator is configured and arranged to receive the additional control signals as inputs and to provide the random number in response to entropic properties of the additional control signals.

15. The apparatus of claim 1, further including another number generator and a circuit configured and arranged to produce a convolved random number by convolving random numbers from both of the number generators.

16. A method comprising:
providing a regulated voltage at an output port of a voltage regulator;
providing feedback responsive to the regulated voltage at the output port;
providing a control signal that varies according to the provided feedback;
providing power to the output port in response to receiving the control signal;
providing a multi-bit random number in response to entropic properties of the control signal; and
storing data in an electronic storage device based on the multi-bit random number.

17. The method of claim 16, further including controlling access to the electronic storage device via an external data-storage circuit.

18. The method of claim 16, wherein storing data in electronic storage device includes storing data in nonvolatile memory devices.

19. The method of claim 16, further including communicating data with external devices by storing received data in the electronic storage device, and by transmitting data from the electronic storage device.

20. The method of claim 16, wherein providing the multi-bit random number includes generating the multi-bit random number in response to a switching state of a switch that provides the power to the output port.

* * * * *